(12) United States Patent
Oh et al.

(10) Patent No.: US 7,924,786 B2
(45) Date of Patent: Apr. 12, 2011

(54) HANDOFF SYSTEM AND METHOD AMONG HETEROGENEOUS NETWORKS AND MOBILE TERMINAL EMPLOYING THE SAME

(75) Inventors: Se-jong Oh, Yongin-si (KR); Jong-ho Bang, Suwon-si (KR); Myung-chul Kim, Daejun (KR); Kyoung-hee Lee, Daejun (KR)

(73) Assignees: Samsung Electronics Co., Ltd., Suwon-si (KR); Research and Industrial Cooperation Group, Daejeon (KR)

( * ) Notice: Subject to any disclaimer, the term of this patent is extended or adjusted under 35 U.S.C. 154(b) by 365 days.

(21) Appl. No.: 11/335,500

(22) Filed: Jan. 20, 2006

(65) Prior Publication Data

US 2006/0176855 A1    Aug. 10, 2006

(30) Foreign Application Priority Data

Feb. 4, 2005 (KR) .................. 10-2005-0010636

(51) Int. Cl.
*H04Q 7/00* (2006.01)

(52) U.S. Cl. ........ 370/331; 370/328; 370/329; 370/347; 370/348; 370/349; 455/426; 455/432; 455/436; 455/437; 455/439

(58) Field of Classification Search .................. 370/331, 370/338, 349, 328, 327, 339; 455/436, 433, 455/432, 426, 437, 439
See application file for complete search history.

(56) References Cited

U.S. PATENT DOCUMENTS

| | | | | |
|---|---|---|---|---|
| 6,654,361 | B1 * | 11/2003 | Dommety et al. | 370/331 |
| 6,725,044 | B2 * | 4/2004 | Verma et al. | 455/444 |
| 6,771,604 | B1 * | 8/2004 | Dommety et al. | 370/238 |
| 6,999,436 | B2 * | 2/2006 | Zheng et al. | 370/331 |
| 2002/0147008 | A1 * | 10/2002 | Kallio | 455/426 |
| 2002/0150062 | A1 * | 10/2002 | Zheng et al. | 370/331 |
| 2003/0050061 | A1 * | 3/2003 | Wu et al. | 455/432 |
| 2004/0166857 | A1 * | 8/2004 | Shim et al. | 455/436 |
| 2004/0202129 | A1 * | 10/2004 | Kolding et al. | 370/331 |
| 2006/0146781 | A1 * | 7/2006 | Adrangi et al. | 370/349 |

* cited by examiner

*Primary Examiner* — Charles N Appiah
*Assistant Examiner* — Michael T Vu
(74) *Attorney, Agent, or Firm* — Sughrue Mion, PLLC

(57) ABSTRACT

Disclosed are a handoff system and a method among heterogeneous networks. The handoff system among heterogeneous networks has plural access nodes which supports wireless communication with a mobile terminal; and a crossover node which selects resources of an access node to which a handoff is made without repetitive communications between access modes and the mobile terminal in selecting an access node. The handoff system performs a handoff to a network if resources of the network are sufficient for wireless communication.

12 Claims, 4 Drawing Sheets

HANDOFF SYSTEM AND METHOD AMONG HETEROGENEOUS NETWORKS AND MOBILE TERMINAL EMPLOYING THE SAME

CROSS-REFERENCE OF RELATED APPLICATIONS

This application claims benefit under 35 U.S.C. §119 from Korean Patent Application No. 10-2005-0010636, filed on Feb. 4, 2005, the entire contents of which are incorporated herein by reference.

BACKGROUND OF THE INVENTION

1. Field of the Invention

Apparatuses and methods consistent with the present invention relate to a handoff system and method among heterogeneous networks, and to a mobile terminal and operation method thereof using the same, capable of performing seamless handoffs to the most appropriate network in aspect of resources of data-link layers and network layers.

2. Description of the Related Art

Recently, with performance improvements of mobile terminals such as handheld computers and Personal Digital Assistants (PDA's), more users use the wireless internet, and advancements of wireless communication technologies provide the users with various types of network environments.

FIG. 1 is a view for showing environments for heterogeneous networks.

The wireless Internet users can use various types of network environments. As shown in FIG. 1, heterogeneous network environments can include Institute of Electrical and Electronics Engineers (IEEE) 802.11 20, IEEE 802.16 30, Wideband-CDMA (W-CDMA) 40, and so on, and, in such wireless internet environments, a mobile terminal 10 can frequently move around and change its network connection point.

In order to enable the mobile terminal 10 to communicate over the wireless Internet, even though the mobile terminal 10 moves to a certain network area beyond its current network area, the mobile terminal 10 in the certain network area should receive the same high quality Internet services as in the current network area.

That is, the mobile terminal 10 has to perform seamless communications, so that a handoff concept is applied. The handoff refers to a function of transferring a process for communications from an access node for the current network area to an access node for another network area.

Meanwhile, recently, the developments of Internet technologies generalize real-time multi-media services such as Video On Demand (VOD), Audio On Demand (AOD), videophones, video chatting, and the like. Specifically, the mobile terminal 10 can be used to get real-time multi-media services together with advancements of the wireless Internet technologies and improvements of the data processing capacity of the mobile terminal 10.

Together with the advancements of the technologies as above, users can be provided with real-time multi-media services through the mobile terminal 10 while moving. Accordingly, lots of studies are continuing on methods enabling effective handoffs to be performed as users roam around.

Heterogeneous networks support different bandwidths one another, but most of the conventional handoff-processing methods for the mobile terminal 10 do not take into consideration the differences among the transmission bandwidths supported by networks to which the mobile terminal 10 is connected before and after the mobile terminal 10 roams around.

For example, if the mobile terminal 10 moves from an area of the Wireless Local Area Network (WLAN) to an area of the 3 Generation Partnership Project (3GPP) network, there exists a transmission bandwidth difference among the two networks since the bandwidth of the WLAN is larger than or equal to 384 Kbps and the bandwidth of the 3GPP network is smaller than 384 Kbps.

As above, if the bandwidth supported by a network before the movement is larger than the bandwidth supported by a network after the movement, the loss of data packets caused by the bandwidth difference cannot be compensated for. Accordingly, there exists a problem of degrading the qualities of real-time multi-media services.

Further, the conventional handoff-processing method for the mobile terminal 10 can be described as below in brief. That is, when the mobile terminal 10 requests a handoff to the access node in a network area to which the mobile terminal 10 moves, the access node allows the handoff if the resources of the network to which the access node belongs are sufficient.

Failing to reserve resources in the network to which the mobile terminal 10 is going to move, the mobile terminal 10 requests again the handoff until finding out another network that has sufficient resources. Thus, there exists a problem that it takes time excessively for retries for resources reservations until the mobile terminal 10 finds out a network having sufficient resources as networks are more overlapped in number.

SUMMARY OF THE INVENTION

Illustrative, non-limiting embodiments of the present invention have been developed in order to solve the above disadvantages and other problems associated with the conventional arrangement. Also, the present invention is not required to overcome the disadvantages described above, and an illustrative, non-limiting embodiment of the present invention may not overcome any of the problems described above. An aspect of the present invention is to provide a handoff system and method among heterogeneous networks, and a mobile terminal using the same and an operating method therefor, capable of seamlessly performing a handoff to the most suitable network in aspect of resources of data-link layers and network layers by detecting all handoff-available heterogeneous networks and performing a handoff to one of the detected networks that has the best wireless communication quality.

According to an aspect of the present invention there is provided a handoff system among heterogeneous networks, comprising: plural access nodes which supports wireless communication; and a crossover node which selects an access node for a handoff among the plural access nodes. In selecting the access node, the crossover node may rely on a predetermined condition comprising at least one of wireless communication quality and a network bandwidth which supports the selected access node.

Preferably, but not necessarily, the mobile terminal is configured to generate a handoff request signal which initiates selecting of the access node, wherein the handoff request signal comprises at least one of an identification (ID) of the mobile terminal and the predetermined condition.

Preferably, but not necessarily, the access node comprises one of an access point and a Base Transceiver System (BTS).

Preferably, but not necessarily, the crossover node selects an access node having best wireless communication quality from an access node list created by the mobile terminal. The access node list comprises accessible access nodes which have been searched for by the mobile terminal.

Preferably, but not necessarily, the access node notifies the crossover node of a resources reservation failure if a resources reservation request has been received from the crossover node and resources of a network to which the access node belongs are insufficient. In here, upon receiving the resources reservation failure from the access node, the crossover node selects another access node from the plural access nodes and reserves resources at the selected other access node.

Another aspect of the present invention is to provide a handoff method among heterogeneous networks comprising plural access nodes which supports wireless communication. The handoff method comprises: selecting an access node for a handoff among the plural access nodes; and selecting another access node for the handoff among the plural access nodes without sending a selection failure notice to the mobile terminal, if the selected access node is determined to be still inappropriate for the handoff. The operation of selecting of the access node may be performed according to a predetermined condition comprising at least one of wireless communication quality and a network bandwidth which supports the selected access node.

Preferably, but not necessarily, the handoff method further comprises generating a handoff request signal by which selecting of the access node is initiated. The handoff signal used in the handoff method may comprise at least one of the identification (ID) of the mobile terminal and the predetermined condition.

Preferably, but not necessarily, the access node used in the handoff method comprises one of an access point and a Base Transceiver System (BTS).

Preferably, but not necessarily, selecting of the access node comprises reserving resources of a network to which the access node belongs after having selected the access node having a best wireless communication quality. Here, the handoff method may further comprise operations of sending a resource reservation request to the access node, and receiving one of a resource reservation success notice if resources of the network are sufficient and a resource reservation failure notice if resources of the network are insufficient.

Preferably, but not necessarily, the handoff method may further comprise operations of selecting another access node out of the plural access nodes for resource reservation if the resource reservation failure notice has been received.

Still another aspect of the present invention is to provide a mobile terminal applied to a handoff system among heterogeneous networks. The mobile terminal comprises an access node search unit which searches for accessible access nodes among plural access nodes; a list-creating unit which creates a list of the searched-for access nodes; and a network interface unit which sends a handoff request signal comprising at least one of an identification (ID) of the mobile terminal, a predetermined condition used in selecting an access node from the access node list, and a handoff request signal.

There is also provided an operation method for a mobile terminal applied to a handoff system among heterogeneous networks, comprising searching plural access nodes for accessible access nodes; creating a list of the searched-for access nodes; and creating a handoff request signal comprising the created access node list; and requesting for a handoff.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

Hereafter, the present invention will be described in detail with reference to the accompanying drawings.

Figure 1:
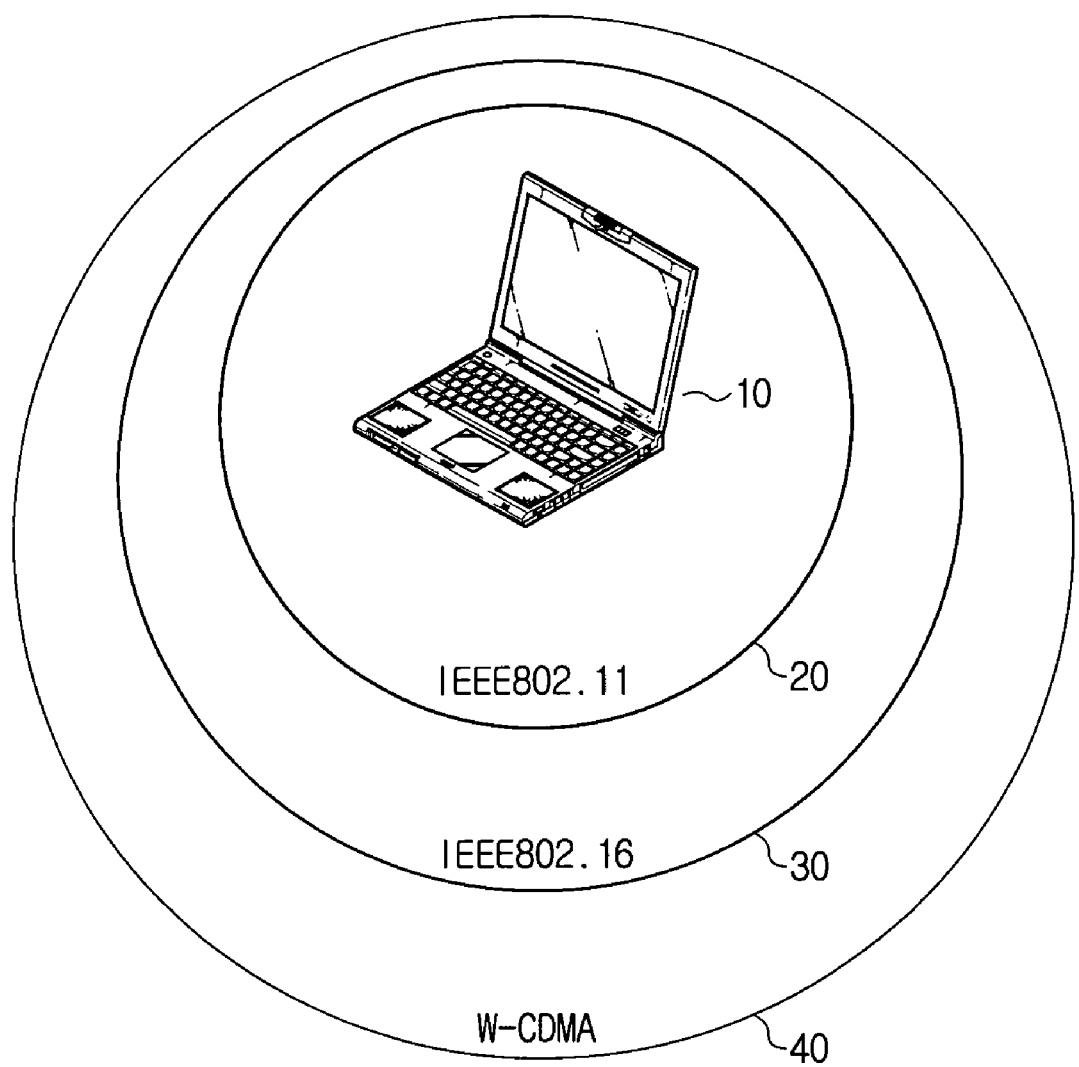
FIG. 1 is a view for exemplarily showing heterogeneous network environments.
Figure 2:
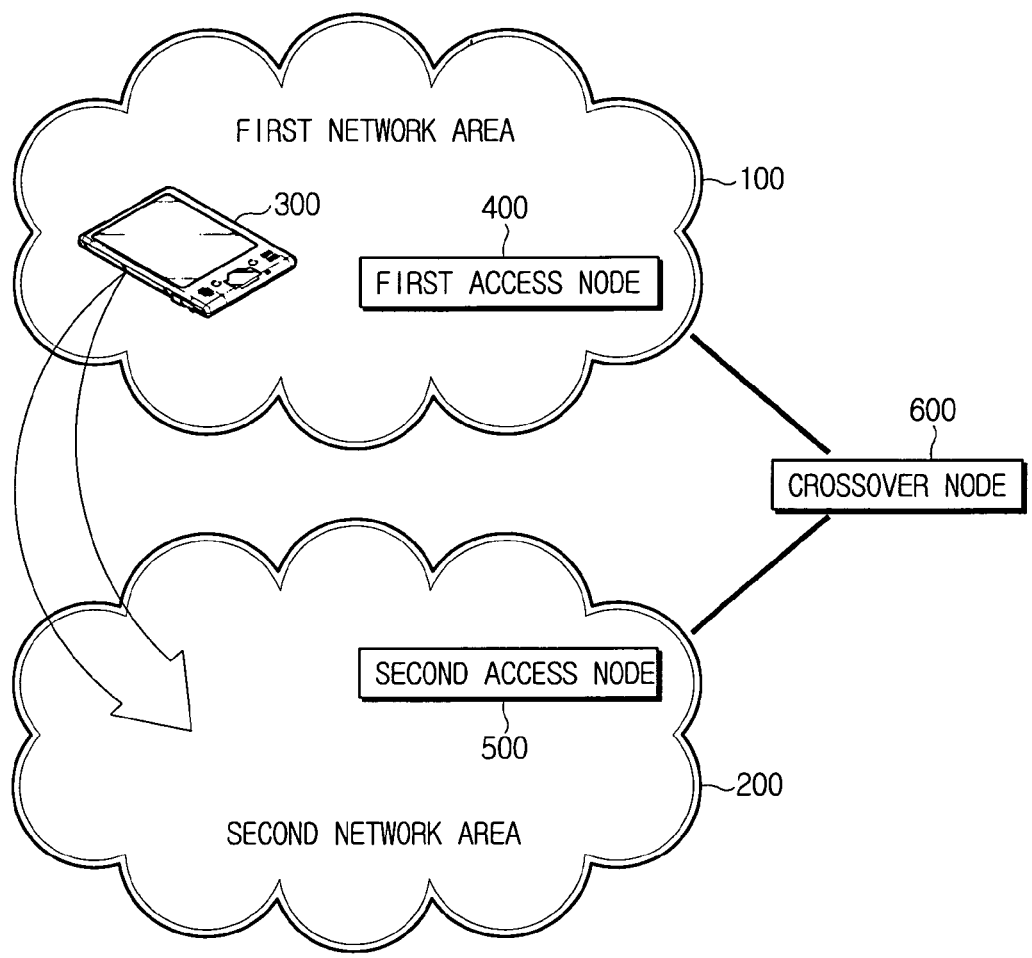
FIG. 2 is a view for explaining a handoff system among heterogeneous networks according to an exemplary embodiment of the present invention.

FIG. 2 is a view for explaining a handoff system among heterogeneous networks according to an exemplary embodiment of the present invention.

In FIG. 2, a handoff system among heterogeneous networks according to an exemplary embodiment of the present invention has a mobile terminal 300 roaming around heterogeneous networks, that is, roaming from a first network area 100 to a second network area 200, and a crossover node 600 for connecting the first and second network areas 100 and 200. Further, the first and second network areas 100 and 200 contain a first access node 400 and a second access node 500, respectively.

The first and second network areas 100 and 200 are heterogeneous networks supporting different bandwidths respectively. For example, the first network area 100 can be a WLAN area supporting a bandwidth higher than 384 Kbps, and the second network area 200 can be a 3GPP area supporting a bandwidth lower than 384 Kbps.

FIG. 2 shows two accessible heterogeneous networks, but the present invention is not limited to FIG. 2, but can be applied to all wireless networks of various kinds.

The mobile terminal (MT) 300 performs wireless communications with the first and second access nodes 400 and 500 in the first and second network areas 100 and 200, and the mobile terminal can be any of diverse terminals such as a handheld computer, a PDA and a mobile phone which are capable of performing wireless communications.

Such a mobile terminal 300 can roam around at any time under wireless Internet environments and change its own network access point. That is, the mobile terminal 300 performs a handoff. To do so, the mobile terminal 300 according to an exemplary embodiment of the present invention searches access nodes, creates an access node list, and sends a handoff request signal. The mobile terminal 300 will be described in detail with reference to FIG. 3 to be later described.

The first access node (AN) 400 provides a wireless communication interface in the first network area 100, and sends and receives data to and from the crossover node 600. In here, the first access node 400 can be either an access point (AP) or a Base Transceiver System (BTS).

In the present exemplary embodiment, it is shown that a mobile terminal 300 moves from the first network area 100 to the second network area 200, so the first access node 400 receives a handoff request signal from the mobile terminal 300 and sends the handoff request signal to the crossover node 600.

The second access node 500 provides a wireless communication interface in the second network area 200, and sends and receives data to and from the crossover node 600. In here, like the first access node 400, the second access node 500 can be either an access point (AP) or a Base Transceiver System (BTS).

The second access node 500 in the present exemplary embodiment checks whether resources of its network are sufficient, if it receives a resource reservation request from the crossover node 600. Next, the second access node 500 notifies the crossover node 600 of a resource reservation success, if the resources are sufficient, and notifies the crossover node 600 of a resource reservation failure, if the resources are insufficient.

The crossover node 600 sends and receives data to and from the first and second access nodes 400 and 500. According to the present exemplary embodiment, upon receiving a handoff request signal from the mobile terminal 300, the crossover node 600 selects, for resource reservation, an access node from the access node list received together with the handoff request signal.

Preferably, but not necessarily, the crossover node 600 can select an access node belonging to a network having the best wireless communication quality out of plural access nodes contained in the access node list. In here, there can be a method using the strength of a received signal and a method using an amount of power of a received signal for checking the wireless communication quality of a network.

Further, notified of a resource reservation failure by the second access node 500, the crossover node 600 selects, for resources reservation, different access nodes in order of wireless communication quality from highest to lowest out of plural access nodes contained in the access node list.

Figure 3:
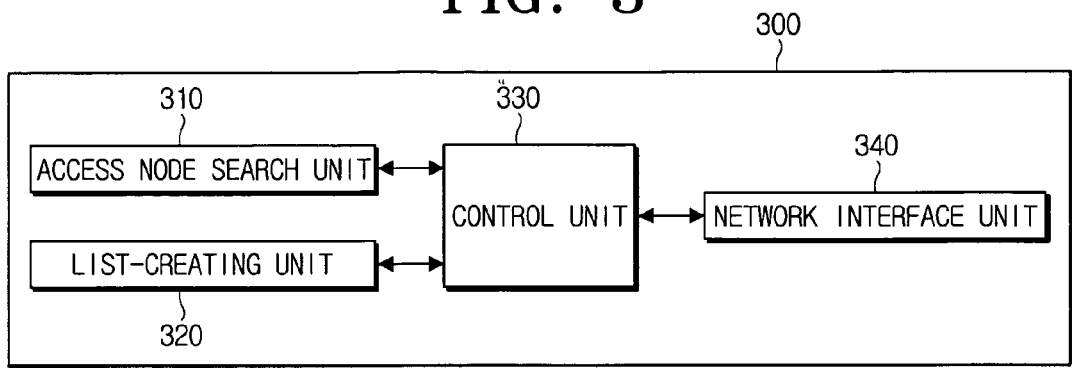
FIG. 3 is a block diagram for showing a mobile terminal according to an exemplary embodiment of the present invention.

FIG. 3 is a block diagram for showing a mobile terminal according to an exemplary embodiment of the present invention.

As shown in FIG. 3, a mobile terminal 300 according to an exemplary embodiment of the present invention has an access node search unit 310, a list-creating unit 320, a network interface unit 340, and a control unit 330.

The access node search unit 310 searches an accessible access node among the plural access nodes. Preferably, but not necessarily, the access node search unit 310 can use the scanning of data-link layer L2 in order to search for the accessible access nodes.

That is, the access node search unit 310 can detect handoff-available networks and catch their L2 identifiers, such as a Media Access Control (MAC) address and a Cell ID, using the L2 scanning.

The list-creating unit 320 creates an access node list for the accessible access nodes searched by the access node search unit 310.

The control unit 330 creates a handoff request signal containing the access node list created by the list-creating unit 320, and controls the network interface 340 so as to send the created handoff request signal.

In here, the handoff request signal created by the control unit 330 can further contain the identifier ID of the mobile terminal 300, that is, its own ID, and a required transmission bandwidth, in addition to the access node list. Preferably, but not necessarily, the access node list can be created in order of wireless communication quality from highest to lowest.

The network interface 340, according to the control of the control unit 330, sends the handoff request signal to the crossover node 600 through the access node of the network currently occupied, that is, through the first access node 400.

Figure 4:
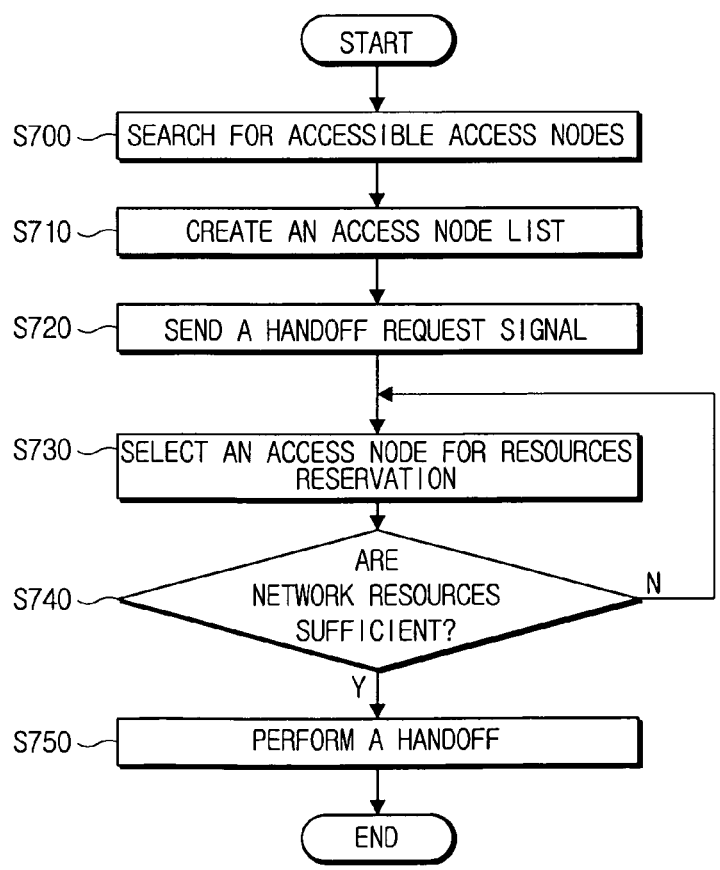
FIG. 4 is a flow chart for explaining a handoff method among heterogeneous networks according to an exemplary embodiment of the present invention.

FIG. 4 is a flow chart for explaining a handoff method among heterogeneous networks according to an exemplary embodiment of the present invention. In here, description will be made on a handoff method among heterogeneous networks with reference to FIGS. 2 to 4 according to an exemplary embodiment of the present invention.

As shown in FIG. 2, when a mobile terminal 300 moves from the first network area 100 to the second network area 200, that is, when in need of performing a handoff, the mobile terminal 300 causes the access node search unit 310 to search the plural access nodes for accessible access nodes (S700).

When the accessible access nodes are completely searched for, the mobile terminal 300 causes the list-creating unit 320 to create an access node list for the accessible access nodes (S710). In FIG. 2, the access node list contains the ID of the second access node 500. In here, the mobile terminal 300 preferably, but not necessarily, creates the access node list in order of wireless communication quality from highest to lowest.

The mobile terminal 300 causes the control unit 330 to create a handoff request signal containing an access node list and causes the network interface unit 340 to send the hand off request signal to the first access node 400, and the first access node 400 sends the handoff request signal received from the mobile terminal 300 to the crossover node 600 (S720).

The crossover node 600 that has received a handoff request signal from the first access node 400 selects, for resources reservation, the second access node 500 which is an access node belonging to a network having the best quality, out of the access node list contained in the received handoff request signal (S730). In here, if the mobile terminal 300 creates the access node list in order of wireless communication quality from highest to lowest, the crossover node 600 reserves resources of an access node first appearing on the access node list.

The second access node 500 that has received a resource reservation request from the crossover node 600 checks whether the resources of the network to which it belongs are sufficient (S740). That is, the second access node 500 checks whether to provide the transmission bandwidth needed for the mobile terminal 300.

If the second access node 500 decides in the step S740 that the resources of the network to which it belongs are sufficient for the mobile terminal 300, the second access node 500 notifies the crossover node 600 of sufficient resources and performs the handoff (S750).

If the second access node 500 decides in the step S740 that the resources of the network to which it belongs are insufficient for the mobile terminal 300, the second access node 500 notifies the crossover node 600 of insufficient resources.

Next, the crossover node 600 selects another access node out of the access node list, and reserves resources (S730). These steps are repeated until an access node having sufficient resources is found.

Figure 5:
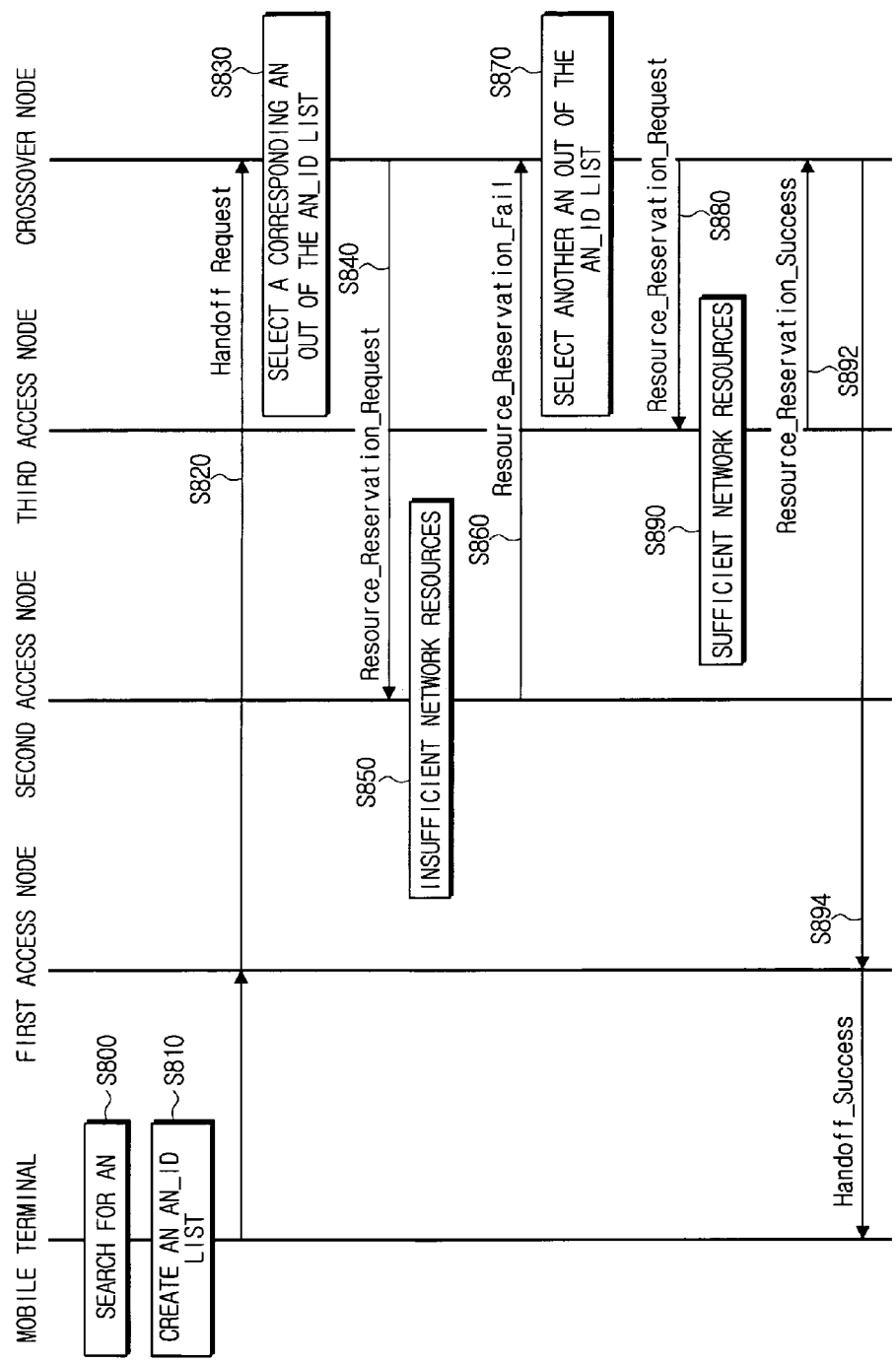
FIG. 5 is a flow chart for showing signal flows for performing the handoff method among heterogeneous networks as shown in FIG. 4.

FIG. 5 is a flow chart for showing signal flows for a method performing a handoff among heterogeneous networks of FIG. 4. In here, description will be made on signal flows for a method performing a handoff among heterogeneous networks with reference to FIGS. 2 to 5.

However, in here, description will be made on a handoff method for a system having the first access node 400 of the first network 100 area in which the mobile terminal 300 is located and the second access node 500 and third access node of the second network area 200 and the third network area to which the mobile terminal 300 moves.

The mobile terminal 300 searches an accessible access node (AN) among the plural access nodes (S800). In here, the accessible access nodes are the second and third access nodes.

If the accessible access nodes are completely searched for, the mobile terminal 300 creates an access node list (AN_ID List) of the searched accessible access nodes (S810).

The mobile terminal 300 sends a handoff request signal to the first access node 400, and the first access node 400 sends the handoff request signal to the crossover node 600 (S820). In here, the handoff request signal can contain the identifier of the mobile terminal 300 (MT_ID), that is, its own ID, the access node list (AN_ID List), and a required transmission bandwidth (Required B/W).

The crossover node 600 that has received the handoff request signal selects out of the AN_ID List an access node to which the handoff is requested (S830). In here, the second access node is assumed to have the best wireless communication quality among the access nodes contained in the AN_ID List.

The crossover node 600 sends to the second access node 500 a signal Resource_Reservation_Request for reserving resources (S840). In here, the resource reservation signal can contain the MT_ID and Required B/W.

The second access node 500 receives a resource reservation signal from the crossover node 600, and checks whether the resources of the network to which it belongs are sufficient. In here, it is assumed that the resources of the network to which the second access node belongs are insufficient (S850).

The second access node 500 sends a signal Resource_Reservation_Fail notifying the crossover node 600 of resources reservation failure (S860). In here, the resources reservation failure notification signal can contain the MT_ID, Required B/W, and a cause of the resources reservation failure.

The crossover node 600 selects out of the AN_ID List the third access node as an access node to perform the handoff, in which the third access node has the wireless communication quality immediately lower in order than the second access node 500 (S870).

If one access node is selected, the crossover node 600 sends again a signal Resource_Reservation_Request for reserving resources to the selected access node, that is, the third access node (S880). In here, the resources reservation signal can also contain the MT_ID and Required B/W.

The third access node that has received a resources reservation signal from the crossover node 600 checks whether the resources of the network to which it belongs are sufficient. In here, the resources of the network to which the third access node belongs are assumed to be sufficient for the handoff of the mobile terminal 300 (S890).

Since the resources of the network to which the third access node belongs are sufficient, the third access node sends a signal Resource_Reservation_Success notifying the crossover node 600 that the resources reservation has been successful (S892). In here, the resources reservation success notification signal can contain the MT_ID, candidate EP, and allocated transmission bandwidth (Allocated B/W).

Next, the crossover node 600 sends a signal Handoff_Success notifying the first access node 400 of the successful handoff, and the first access node 400 sends the mobile terminal 300 the handoff success notification signal received from the crossover node 600. In here, the handoff success notification signal can contain the MT_ID, selected access node ID, that is, the third access node ID, candidate EP, and allocated transmission bandwidth.

As described in FIG. 4, the handoff system and method among heterogeneous networks according to an exemplary embodiment of the present invention let the crossover node 600 reserve resources of the third access node automatically if failed to reserve resources of the second access node 500.

Accordingly, the exemplary embodiment of the present invention can omit a step of sending the first access node 400 and the mobile terminal 300 a signal notifying of resources reservation failure if the resources reservation of the second access node 50 failed. Further, the exemplary embodiment of the present invention can omit a step for the mobile terminal 300 to send again the crossover node 600 a signal requesting for a handoff.

As described above, the handoff system and method among heterogeneous networks and the mobile terminal employing the same and the operation method thereof let a mobile terminal detect all the heterogeneous networks to which a handoff can be performed, and perform the handoff to one of the detected networks which has the best wireless communication quality, bringing out an advantage capable of seamlessly performing a handoff to the most suitable network in aspect of resources of data-link layers and network layers.

Further, as above, the exemplary embodiment of the present invention can reduce the number of times of repeated resource reservation signal transmission for searching for an appropriate wireless heterogeneous network, so it has an advantage capable of remarkably reducing resource reservation time which is likely to increase as the number of heterogeneous networks increases.

The foregoing embodiments and advantages are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. A handoff system among heterogeneous networks, comprising:
    plural access nodes which support wireless communication with a mobile terminal, and comprises first and second access nodes, the mobile terminal being connected to the first access node;
    a crossover node which is connected to the plural access nodes, and reserves resources of the second access node which the crossover node selects from among the plural access nodes for a handoff of the mobile terminal from the first access node if a request signal for the handoff is received from the mobile terminal; and
    a mobile terminal configured to generate the handoff request signal for the handoff which initiates selecting of the second access node by the crossover node,
    wherein the mobile terminal creates an access node list comprising accessible access nodes, including the second access node, that are available for the handoff, and send the access node list to the crossover node separately from the handoff request signal or as a part of the handoff request signal,
    wherein the crossover node is configured to select the second access node if the second access node satisfies a predetermined condition,
    wherein the crossover node is further configured to receive from the mobile terminal at least one of an identification (ID) of the mobile terminal and the predetermined condition,
    wherein the predetermined condition comprises at least one of wireless communication quality and a network bandwidth, and wherein the crossover node is further configured to select, among the plural access nodes, a third access node to which the handoff of the mobile terminal is to be made from the first access node without sending a selection failure notice to the mobile terminal, if the second access node is determined to be still inappropriate for the handoff.

2. The handoff system as claimed in claim 1, wherein the handoff request signal comprises at least one of the identification (ID) of the mobile terminal and the predetermined condition.

3. The handoff system as claimed in claim 1, wherein a cause of the inappropriateness for the handoff to the second access node comprises insufficiency of network resources of a network to which the second access node belongs.

4. The handoff system as claimed in claim 1, wherein the mobile terminal is configured to:
  search for accessible access nodes for the handoff among the plural access nodes;
  create an access node list comprising the searched-for accessible access nodes, including the second access node, that are available for the handoff; and
  send the access node list to the crossover node separately from the handoff request signal or as a part of the handoff request signal.

5. The handoff system as claimed in claim 4, wherein the access node list is created according to the predetermined condition comprising at least one of wireless communication quality and a network bandwidth.

6. The handoff system as claimed in claim 5, wherein the crossover node selects the second access node from the access node list according to the predetermined condition.

7. The handoff system as claimed in claim 1, wherein the crossover node is configured to reserve resources of a network to which the second access node belongs, if the crossover node selects the second access node for the handoff.

8. The handoff system as claimed in claim 7, wherein the crossover node is further configured to:
  send a resource reservation request to the second access node; and
  receive one of a resource reservation success notice, if resources of the network are sufficient, and a resource reservation failure notice if resources of the network are insufficient.

9. The handoff system as claimed in claim 8, wherein the crossover node is further configured to:
  select a third access node from the plural access nodes if the crossover node has received the resource reservation failure notice; and
  send another resource reservation request to the third access node.

10. The handoff system as claimed in claim 1, wherein each of the heterogeneous networks supports a different bandwidth and different data communication protocol, and
  wherein networks which are served by the first and second access nodes are respective heterogeneous networks of the heterogeneous networks.

11. The handoff system as claimed in claim 1, wherein the first access node is configured to server one of a wireless local access network (WLAN) and a Third Generation Partnership Project (3GPP) network, and the second access node is configured to the other of the WLAN and the 3GPP network.

12. The handoff system as claimed in claim 1, wherein the first access node comprises one of an access point and a Base Transceiver System (BTS), and the second access node comprises the other of the access point and the BTS.

* * * * *